3 Sheets—Sheet 1.
S. M. WORTHINGTON & T. T. TEMPLIN.
Seed-Planter.
No. 214,227. Patented April 8, 1879.
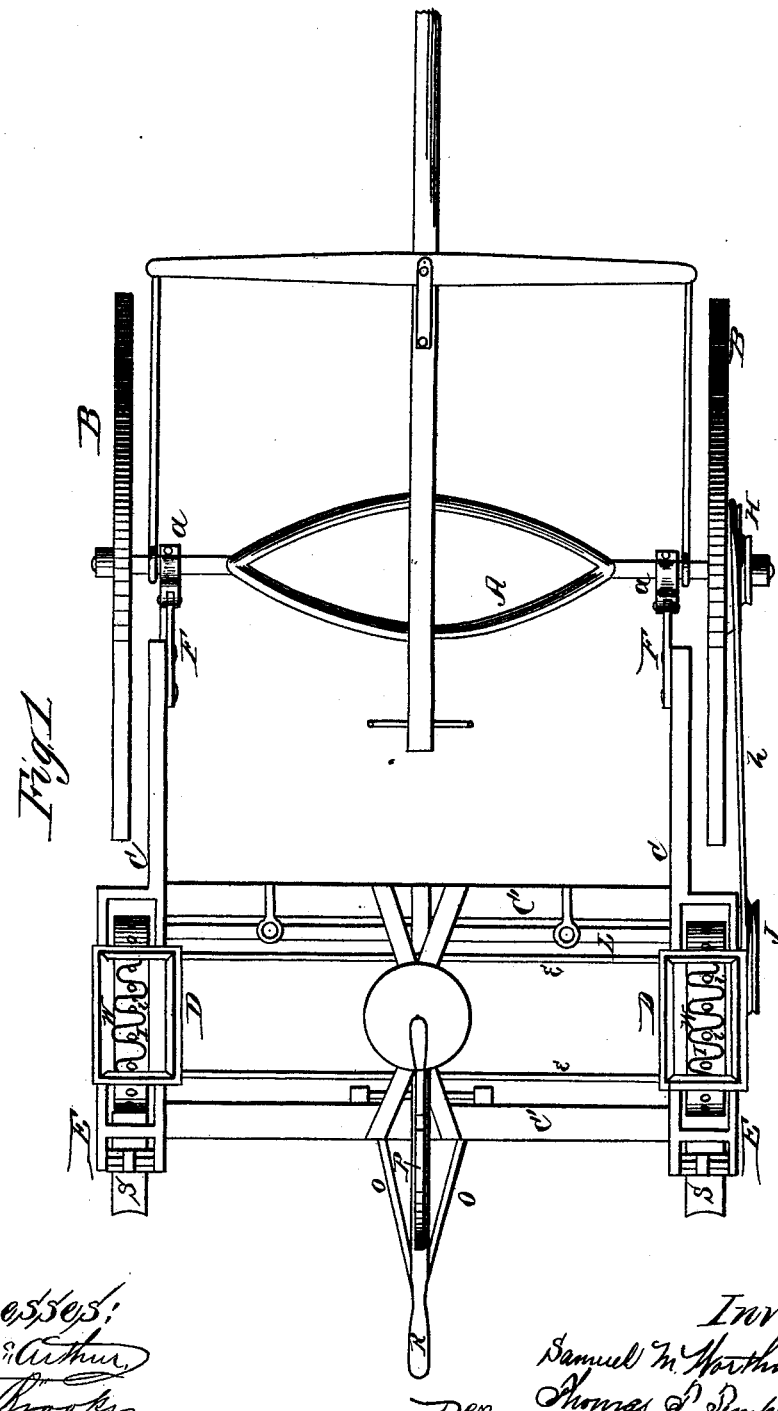

3 Sheets—Sheet 2.
S. M. WORTHINGTON & T. T. TEMPLIN.
Seed-Planter.
No. 214,227.        Patented April 8, 1879.
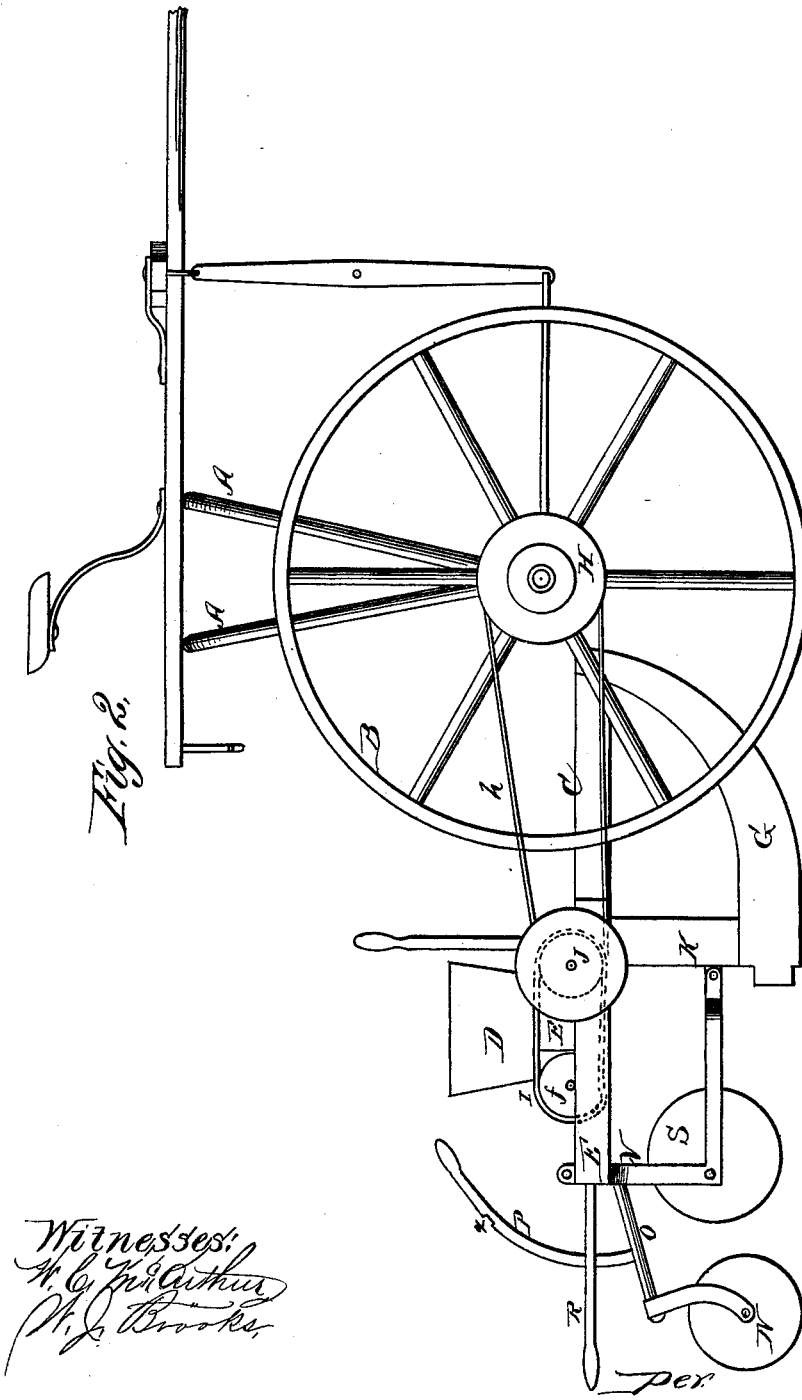

3 Sheets—Sheet 3.
S. M. WORTHINGTON & T. T. TEMPLIN.
Seed-Planter.
No. 214,227. Patented April 8, 1879.
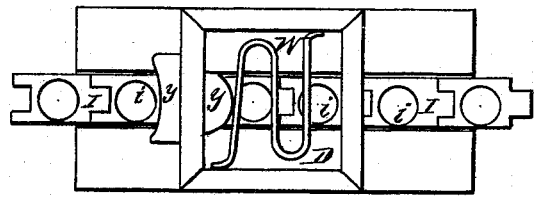
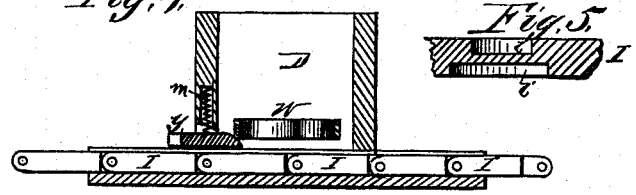
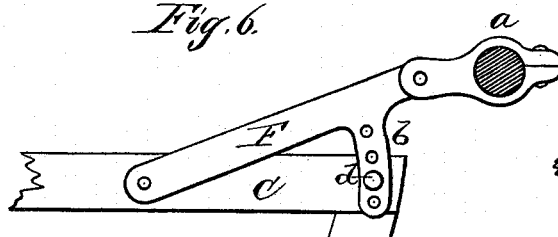
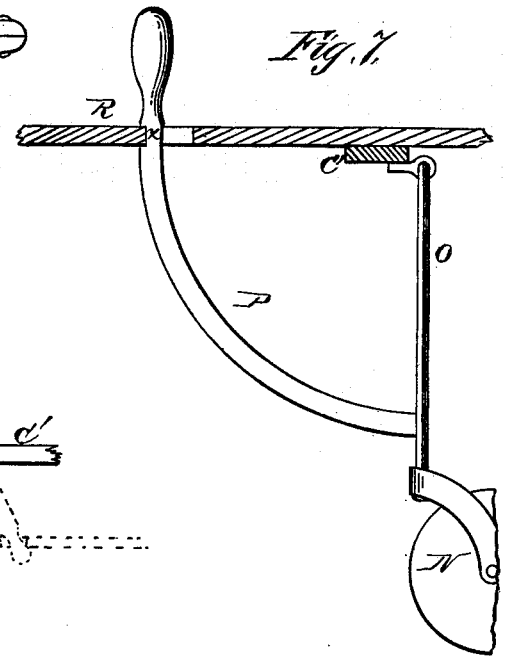
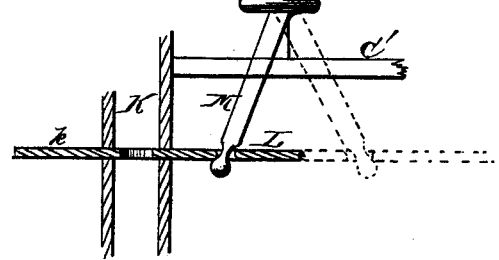

UNITED STATES PATENT OFFICE.

SAMUEL M. WORTHINGTON AND THOMAS T. TEMPLIN, OF FERN LEAF, KY.

IMPROVEMENT IN SEED-PLANTERS.

Specification forming part of Letters Patent No. 214,227, dated April 8, 1879; application filed February 20, 1879.

*To all whom it may concern:*

Be it known that we, SAML. M. WORTHINGTON and THOS. T. TEMPLIN, of Fern Leaf, in the county of Mason and State of Kentucky, have invented certain new and useful Improvements in Seed-Planters; and we do hereby declare that the following is a full, clear, and exact description of the invention, reference being had to the accompanying drawings, and to the letters of reference marked thereon, which form part of this specification.

The nature of our invention consists in the peculiar construction of the endless dropping-chain, and, in combination therewith, such devices as will be hereinafter described, and specifically set forth in the claims.

In order to enable others skilled in the art to which our invention appertains to make and use the same, we will now proceed to describe its construction and operation, referring to the annexed drawings, in which—

Figure 1 is a plan view, and Fig. 2 a side elevation, of our invention. Fig. 3, 4, 5, 6, 7, and 8 are detailed views of parts thereof.

A represents the arched axle, with wheels B B, of an ordinary two-horse corn-cultivator.

The frame of the corn-planter attachment is composed of two parallel side bars, C C, connected by two cross-bars, C' C'. the side bars projecting a suitable distance in front, as shown. To each end of this frame is attached a slotted casting, E, on top of which, or above which, the hopper or corn-box D is secured.

The corn-planter frame C C' is attached to the axle A of the cultivator by means of an iron bar, F, pivoted to each side bar, C, and the front end of said bar F fastened by a clip, a, to the axle. Near the center of the bar F is a downwardly-projecting lug or arm, b, having holes in it for the passage of a bolt, d, to rigidly secure the bar F to the side bar of the corn-planter frame. By this construction we are enabled to change the pitch of the swords G by changing the bolts d, running through the lugs B, in different holes.

Each corn-box is provided with an endless drop-chain, composed of a series of solid links, I I, pivoted together. Each link of this chain is provided with two cups, i i, one on each side, and of different diameters, whereby we are enabled to drop large or small corn by running either side up. The chain I I passes over small wheels f f, in front and rear of the corn-box, attached to shafts e e, running from side to side of the planter-frame.

The driving-power for the planter is obtained by means of a double pulley, H, attached to the outside of one of the cultivator-wheels B, which pulley is connected to a corresponding pulley, J, on one of the shafts e by means of a belt or chain, h. These pulleys are so constructed that when the driving-belt is on one set of pulleys the drop-chain will bring out of the box one grain for every foot the machine passes over the ground, so that when the machine has gone four feet four grains will have been taken out, which are caught near the bottom of the tubes or conductors K, leading down to the swords by a tongue or valve, k, in said tubes, and are let out at will by means of the dropping-lever M, which is attached to a bar, L, running from one tube to the other, and attached to the tongues or valves in said tubes. This will give four grains to the hill when the hills are four feet apart. When the driving-belt h is on the other set of pulleys the drop-chain I will carry out one grain every sixteen inches, which will give three grains to every hill when four feet apart.

When it is desired to drill it is only necessary to fasten the drop-lever M in such a position as to hold the tongues or valves k in the center of the tubes, so as to let the corn pass directly to the ground without being caught. This will deposit one grain in a place twelve or sixteen inches apart, as may be desired, by changing the drive-belt from one set of pulleys to the other.

The lifting apparatus for raising the planter out of the ground to enable the operator to turn at the ends of the rows or drive from field to field consists of a caster-wheel, N, connected to two upright bars, O O, hinged to the rear cross-bar, C'. When raised for turning it is supported by a curved brace, P, which catches in a notch, x, while passing through the lifting-bar R. After turning, the brace P is pushed forward and the planter drops to the ground.

The press-wheels S, for covering the corn, are each fastened by bent bars V V, running perpendicular on each side to end of casting E and horizontally to the tube K. The wheel can be raised or lowered by changing the bolt in the ends of perpendicular rods up or down in different holes, by which means the operator is enabled to plant deep or shallow by raising or lowering the press wheels, since the weight of the operator will force the swords into the ground until the press-wheels rest firmly on the ground.

Each corn-box D is provided with an S-shaped feeder, W, and a cut-off, Y. A spiral spring, $m$, is applied on top of the cut-off by letting said spring into a hole bored in the corn-box.

Having thus fully described our invention, what we claim as new, and desire to secure by Letters Patent, is—

1. The endless drop-chain, composed of the solid pivoted links I, having cups $i$, of unequal diameter, on opposite sides, for the purposes herein set forth.

2. The combination of the endless drop-chain, constructed, as set forth, with shafts $e\ e$ and wheels $f\ f$, substantially as and for the purposes set forth.

In testimony that we claim the foregoing as our own we affix our signatures in presence of two witnesses.

SAMUEL M. WORTHINGTON.
  THOS. T. TEMPLIN.

Witnesses:
  V. M. PEPPER,
  W. F. REYNOLDS.